March 17, 1942.     B. B. HARDING     2,276,540
COFFEE PERCOLATOR
Filed April 4, 1938     3 Sheets-Sheet 1
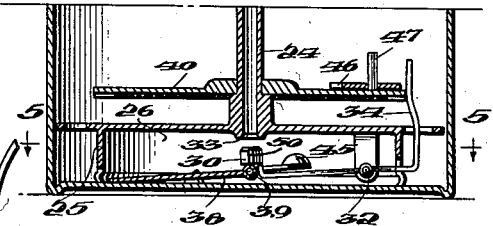
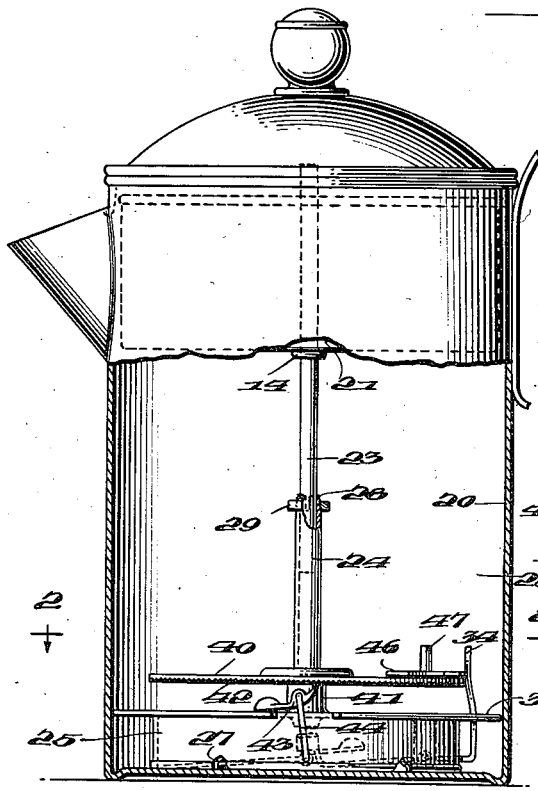
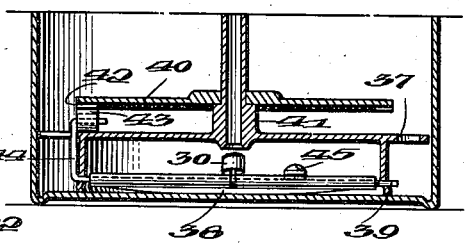
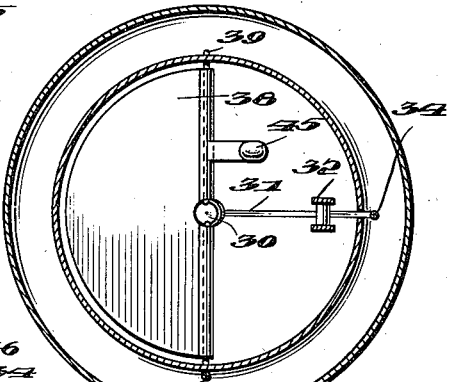
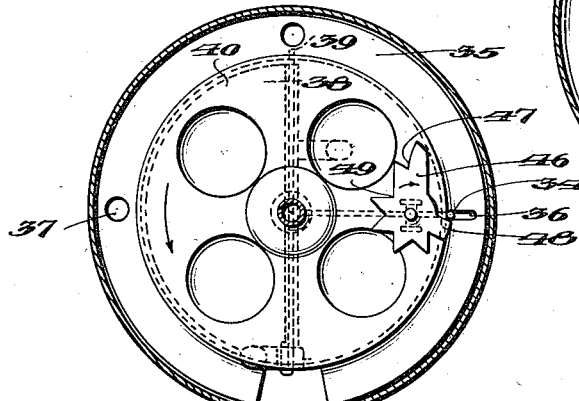
Inventor
Brooks B. Harding,
By Edmund H. Parry
Attorney March 17, 1942.  B. B. HARDING  2,276,540
COFFEE PERCOLATOR
Filed April 4, 1938   3 Sheets-Sheet 2
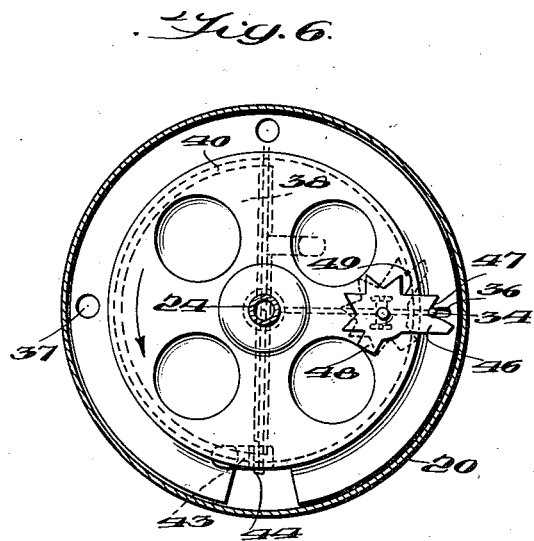
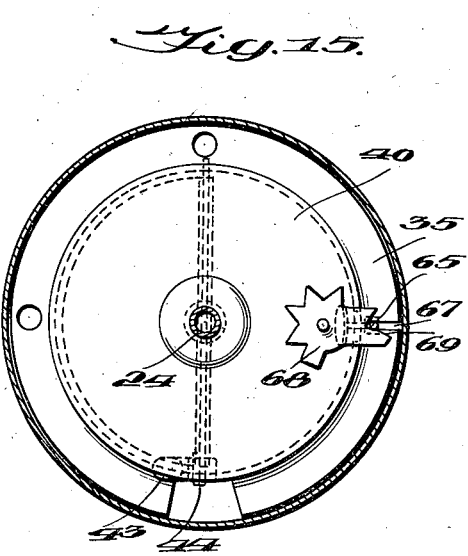
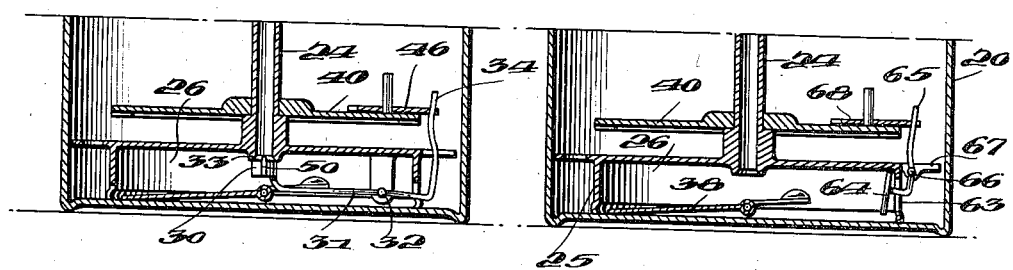
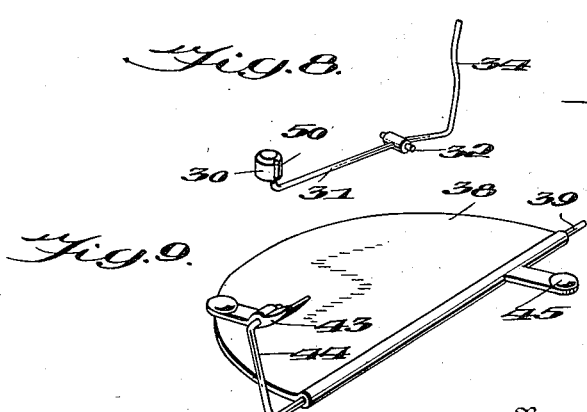
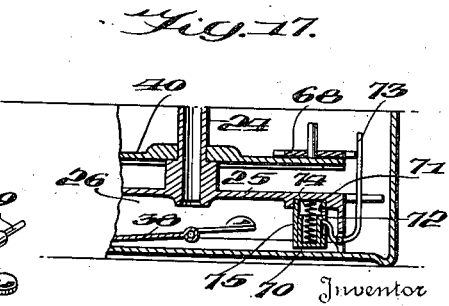
Inventor
Brooks B. Harding,
By Edmund H. Perry
Attorney March 17, 1942.   B. B. HARDING   2,276,540
COFFEE PERCOLATOR
Filed April 4, 1938   3 Sheets-Sheet 3
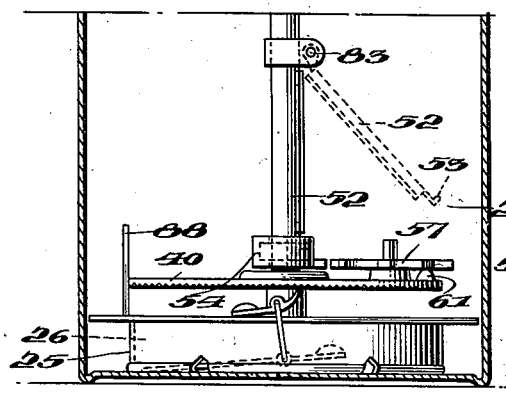
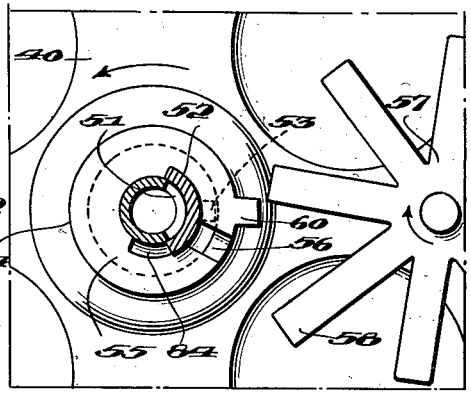
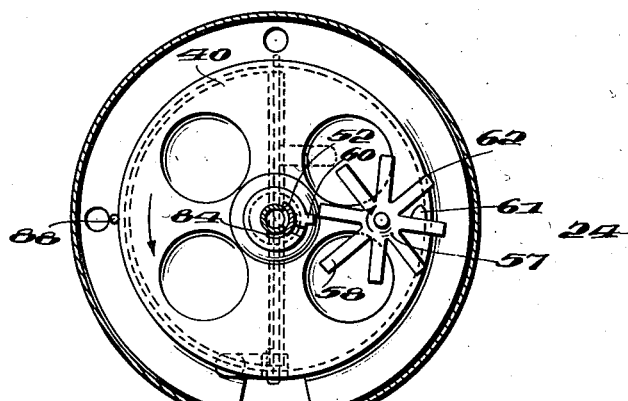
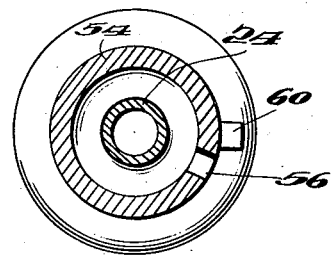
Inventor
Brooks B. Harding,
By Edmund H. Parry Patented Mar. 17, 1942

2,276,540

UNITED STATES PATENT OFFICE 2,276,540

COFFEE PERCOLATOR

Brooks B. Harding, Freeport, N. Y.

Application April 4, 1938, Serial No. 200,012

15 Claims. (Cl. 53—3)

This invention is concerned with coffee percolators and similar beverage infusion apparatus wherein, upon the application of heat, liquid is caused to circulate from a liquid storage chamber to and through a bed of infusing material. The invention is primarily directed to the provision of automatic means effective to stop the flow of liquid to the infusing material after the coffee or other infusion has reached the desired strength.

It is a further feature of the invention to provide means for positively controlling the flow of liquid to the infusing material which will be equally effective whether or not heating be continued. In this respect the invention differs from prior controls for infusion apparatus which function to discontinue the application of heat to the infusion vessel. The invention is capable of universal application to percolators employing any type of external heating unit as well as to percolators employing a built-in electric, or other, heating unit.

It is another object of the invention to provide a time control for percolators and similar infusion apparatus which is inoperative during the initial heating of the liquid and which is automatically brought into operation at or about the time the liquid commences to circulate to the infusing material. The timing mechanism is responsive to the condition of the liquid itself so that the timing period will begin with the initiation of the infusing operation, and it is therefore immaterial to the successful operation of the invention whether the liquid to be infused is brought to a boil slowly or rapidly.

It is a further object of the invention to provide a timing mechanism adapted to effect discontinuance of the infusing operation which may be adjusted to insure a uniform strength infusion on all occasions.

It is a further object of the invention to provide a variable timing mechanism for stopping the infusing operation in percolators which will automatically vary the timing period from the initial flow of liquid through the infusing material. The inventive structure is such as to automatically take account of the intensity of heat applied to and obtained in the liquid. Thus if a low heat is employed and the liquid flows at a slow rate to the infusing material a longer timing period will be obtained before the infusing operation is stopped than in the case where high heat is employed and the liquid flows at a fast rate to the infusing material.

The invention involves a novel arrangement for effecting stoppage of the flow of liquid to the infusing material, which arrangement, as hereafter indicated, may be embodied in a variety of different forms. The invention also involves a novel type of timing mechanism useful with, but capable of other adaptations than with such control arrangement which depends for its operation on the condition of the liquid, and which is adapted to be removably housed within the infusion apparatus.

The control arrangement and the timing mechanism therefor are extremely simple and compact in construction, and the same are so designed that they may be manufactured as a unit for installation either at the factory or in the home in any of the conventional types of electric percolators and various types of coffee pots intended to be used with an external source of heat.

Various features of the invention will be understood by reference to the illustrative embodiments shown in the accompanying drawings now to be described.

In such drawings:

Fig. 1 is a side view of a simple type of percolator with a portion of the side wall broken away and showing therein one embodiment of the invention;

Fig. 2 is a sectional view taken on the line 2—2 of Fig. 1;

Fig. 3 is a fragmentary sectional elevation of certain of the operating parts shown in Fig. 1;

Fig. 4 is a similar view taken at right angles to Fig. 3;

Fig. 5 is a view taken at line 5—5 of Fig. 3;

Fig. 6 is a view corresponding to Fig. 2, but showing certain of the operating parts in different positions;

Fig. 7 is a fragmentary sectional view similar to Fig. 3 but indicating the operative relation of parts corresponding to the showing in Fig. 6;

Figs. 8 and 9 are perspective views somewhat enlarged of certain of the operating parts in the embodiment shown in Figs. 1 through 7;

Fig. 10 is a fragmentary sectional elevation of a percolator illustrating a second embodiment of the invention differing in certain particulars from that of the previous views;

Fig. 11 is a view looking down on the structure of Fig. 10;

Fig. 12 is a view taken on line 12—12 of Fig. 14;

Fig. 13 is an enlarged view of certain of the operating parts shown in Fig. 11;

Fig. 14 is a sectional elevation of certain parts shown in Fig. 10;

Fig. 15 is a view corresponding to Fig. 6, but illustrating a third embodiment of the invention;

Fig. 16 is a fragmentary sectional elevation of the embodiment shown in Fig. 15; and, Fig. 17 is a fragmentary sectional elevation illustrating a modification of the embodiments of Figs. 15 and 16.

Referring first to the embodiments of Fig. 1 through 9, a conventional coffee percolator vessel 20 is shown having a container 21 in its upper portion adapted to house coffee or other infusing material, and through which liquid is circulated from and back to the lower liquid storage chamber 22 by means of a fountain, or percolating, tube whose upper portion 23 is provided with an enlargement or flange 14 for supporting the upper container 21.

In the lower portion of the vessel is an inverted housing 25 forming a heating chamber 26. Liquid from the storage chamber enters the heating chamber through one or more ports 27 in the housing and is forced upwardly under fluid pressure through the fountain tube, discharged at the upper end of the fountain tube and, percolating downwardly through the infusing material in the upper container 21, circulates back to the storage chamber. The lower portion 24 of the fountain tube communicates at its base with the liquid heating chamber, and is here shown as separately formed and telescoping the upper portion 23 of the tube. Such telescopic arrangement is desirable where the operating mechanism of the invention is to be employed with various sizes of percolators so that the fountain tube, where supplied as a part of the invention unit, may be adjusted to the proper height to suitably position the container 21 in the upper portion of the percolator. The upper end 28 of the lower section of the fountain tube is slotted and threaded, and a locking nut 29 is provided to secure the telescoping sections in adjusted position.

The stoppage in the circulation of liquid to the infusing material container 21, according to the present embodiment of the invention, is obtained by means of a cut-off valve 30 which will serve to shut off the flow of liquid from the heating chamber 26 through the fountain tube. Valve 30 is mounted on an arm 31 as shown in Fig. 8, which is pivotally supported at 32 in the heating chamber 26 as shown in Fig. 3. Valve 30 is movable to engage the inlet end 33 of the fountain tube when in raised position. The valve supporting arm 31 extends outwardly through a slot in housing 25 and is provided with an upturned portion 34 through which the valve is actuated by mechanism shortly to be described.

Extending around housing 25 is a flange 35 serving to space arm portion 34 and other movable operating parts of the invention against contact with the side walls of the percolator. Such flange is provided with a slot 36 for arm portion 34 and, to insure the free flow of liquid from the storage chamber 22 downwardly to the heating chamber, may be provided with one or more relatively large ports 37.

The timing mechanism for the cut-off valve 30 comprises a fluid motor actuatable by the heated liquid. Such motor comprises a vane, or similar impelling member 38, best shown in Fig. 9, which is mounted on a shaft 39 for reciprocatory movement in the heating chamber 26. The heating of liquid in the heating chamber beginning at or about the time the liquid reaches a boil results in an agitation of the liquid in the chamber, and such agitation serves to reciprocate vane 39 up and down on its shaft at a rate dependent upon and variable with the intensity of the agitation.

A wheel 40 is supported by a bushing 41 for rotation on the lower portion 24 of the fountain tube, and on the underside of the wheel are a series of teeth 42 with which coacts a weighted pawl member 43 carried by the upturned portion 44 of the impeller member shaft 39. As the impeller member 38 which is provided with a counterweight 45 is moved upwardly by the liquid in the heating chamber arm 44 swings to the right from the position shown in Fig. 1 and causes pawl 43 to rotate wheel 40 in a counterclockwise direction. Each time the impeller member moves upwardly in its reciprocatory path wheel 40 will be rotated. In normal operation I found that with the arrangement illustrated wheel 40 makes one complete rotation in approximately a minute. It will be understood, however, that the speed of operation of the impeller member 38 and wheel 40 will be determined by the rapidity of agitation of the liquid in the heating chamber 26, and this of course will in turn be dependent upon whether a low or a high heat is employed.

Wheel 40 of the fluid actuated motor is caused to actuate valve 30 through the provision of a timing wheel, or gear, 46 supported for rotation adjacent the periphery of wheel 40 on stub shaft 47. Such wheel is provided with a series of notches adapted to receive the upstanding portion 34 of the valve arm 31. By comparing Figs. 2 and 6 it will be observed that each time wheel 40 makes a revolution arm portion 34 engages one of the teeth of wheel 46 and causes partial rotation of the wheel in a clockwise direction. Each partial rotation of wheel 46 will cause arm portion 34 to engage the next notch in the wheel following the next complete rotation of the motor wheel 40. It will be observed that notch 47 is located a greater distance radially from the other supporting shaft of timing wheel 46 than the other notches. In Fig. 2 arm portion 34 engages tooth 48. As motor wheel 40 rotates the timing wheel past arm portion 34 the timing wheel is rotated from the position shown in Fig. 2 to the position shown in dotted line in Fig. 6. The timing wheel is now in such position that on the completion of the next rotation of motor wheel 40 shaft portion 34 will be engaged by notch 47. The wheel will rotate to the position shown in full line in Fig. 6, and in doing so will cam arm portion 34 outwardly until the parts attain the full line position shown in Fig. 6, and also shown in Fig. 7. During such movement valve 30 will be swung upwardly from the position shown in Fig. 3 into engagement with its seat as shown in Fig. 7, thus cutting off the flow of liquid from heating chamber 26 into the fountain tube 24. The supply of liquid to the infusing vessel 21 is thus stopped. Because the actuating force of the fluid against the impeller member 38 is relatively slight, such member and wheel 40 will stop when the parts have reached the position shown in Fig. 7. Any pressure building up in the heating chamber 26 by reason of the continued heating of the percolator after valve 30 closes will cause a backflow of liquid through the inlet ports 27, the various openings in the flange 35 up into the liquid storage chamber, such pressure then escaping around the top of the percolator.

Timing wheel 46 may be initially set when the percolator is prepared for operation so that motor wheel 40 will make from one to seven revolutions before the timing wheel is brought into the position shown in Fig. 6 at which arm portion 34 is actuated to close valve 30. As previously stated wheel 40 will make one revolution in approximately one minute. By initial setting of the timing wheel it is therefore possible to vary the percolating period during which liquid will be supplied through the fountain tube and allowed to flow through the infusing material between approximately one and seven minutes. When the wheel is to make seven revolutions before effecting closing of the valve timing wheel 46 will be set with notch 49 at the periphery of the motor wheel 40. If only one minute percolation were desired the timing wheel would be set in the position shown in Fig. 2.

As has been previously stated the motor impeller 38 will rotate wheel 40 at a speed determined by the intensity of boiling of liquid in the heating chamber 26, which latter also determines the rapidity of flow of liquid to the infusion chamber. The more rapid the circulation of liquid the shorter the period necessary to obtain an infusion of the desired strength. It will thus be seen that the timing device automatically adjusts the timing periods for the infusing operation to accord with the rate of liquid circulation. If during the timing period the boiling of the liquid in chamber 26 becomes more intense and produces an increased flow to the infusing chamber, the timing mechanism will automatically speed up to shorten the timing period preceding its closing of valve 30.

It may sometimes be found desirable to provide valve 30 with one or more grooves 50 as shown in Figs. 7 and 8 so as to facilitate the escape of steam generated in the heating chamber 26 when valve 30 is closed. It has been found that satisfactory venting can be obtained in this manner without making the grooves so large that there will be a continued discharge of liquid from the fountain tube to the infusing chamber regardless of the fact that the heater is still in operation.

The embodiment of Figs. 10 through 14 employs the same fluid motor, including the rotatable wheel 40, as the form previously described. In the present case, however, a pressure relief valve is employed in lieu of the cut-off valve 30. Here the lower portion 24 of the fountain tube is provided with a longitudinal slot 51 in its side wall which during the flow of liquid upwardly through the fountain tube is closed by a flap valve 52 pivotally supported at 83 by a mounting on the fountain tube. Extending from the lower end of valve 52 is a projecting finger 53 engageable by a rotatable bushing 54. As best shown in Fig. 14 such bushing is hollow and the upper wall 55 thereof is adapted to ride on finger 53 so as to be maintained clear of contact with the rotating motor wheel 40. The bushing is provided with a short circumferential slot 84 in its upper wall 55 and a connecting radial slot 56. In the position shown in Fig. 13 finger 53 is locked in slot 84 of the bushing and prevents opening of the flap valve 52. A slight rotation of the bushing to the right brings slot 56 in line with finger 53 so that the finger may move outwardly therethrough to permit valve 52 to open.

Mounted on the rotatable wheel 40 is a timing wheel or gear 57 the arms of which successively engage a stationary pin 88 fixed to the housing 26. Each time wheel 40 makes one revolution in a counter-clockwise direction the timing wheel is given a partial revolution in a clockwise direction. Arm 58 of the timing wheel is made longer than the others so as to engage stop 60 fixed to the rotatable bushing 54. A wedge-shaped stop 61 providing for unidirectional rotation of the timing wheel is secured to motor wheel 40. The arms of the timing wheel ride up the upper inclined side thereof, raising the wheel, and then drop off the front edge of the stop so as to be prevented by the stop from backward rotation.

In Fig. 11 arm 58 of the timing wheel will clear stop 60 as it is carried thereby upon further rotation of motor wheel 40. In the next half revolution arm 62 of the timing wheel will engage pin 88 located on the opposite side of the housing from the flap valve and the wheel will be turned to bring arm 58 of the timing wheel into operative position. During the next half revolution the timing wheel will be brought around to the valve side of the structure and arm 58, being held by stop 61 against backward rotation, will engage stop 60, rotating the same in a counter-clockwise direction as far as necessary to bring slot 56 opposite valve finger 53. Thereupon, due to the fluid pressure existing in the fountain tube 24 valve 52 will swing open as indicated in dotted lines in Fig. 10. The liquid which is forced upwardly from the heating chamber is thus by-passed from the fountain tube back into the storage chamber 22. Pressure is thus sufficiently relieved in the fountain tube that liquid will no longer be discharged from its upper end into the infusing chamber.

In the embodiment of Figs. 15 and 16 a pressure relief, or by-pass, valve is again employed. In this case the valve is located in the housing 25 of the heating chamber 26 instead of in the fountain tube as in the previous embodiment. A port 63 is provided in the side wall of the housing 25 as shown in Fig. 16. An inwardly opening valve 64 coacts with the port, such valve being carried by an arm 65 pivotally supported at 66 and movable in a slot 67 in flange 35 which surrounds the housing.

A timing wheel 68, which may be identical with the timing wheel 46 in the embodiment of Figs. 1 to 7, is carried by the motor wheel 40. The fluid operating motor responsive to the agitation of liquid in the heating chamber, including impeller member 38 and wheel 40, will be the same as before. Timing wheel 68 will be rotated part of a revolution on each full revolution of motor wheel 40 by engagement of the teeth thereof with valve arm 65. Finally notch 69 of the timing wheel will be brought opposite the valve arm as shown in Fig. 15. The valve arm will be swung outwardly, moving valve 64 inwardly to open port 63. Pressure in the heating chamber 26 will thus be relieved and the flow of liquid upwardly through the fountain tube to the infusing chamber will be stopped. When the parts reach the position shown in Figs. 15 and 16, resistance is offered to the further rotation of motor wheel 40, and the same will stop, thus causing valve 64 to remain open regardless of continued heating and agitation of liquid in the heating chamber.

The embodiment of Fig. 17 is a modification of the arrangement shown in Fig. 16. Instead of providing a pressure relief port and closure valve therefor as in Fig. 16 pressure in the heating chamber 26 is relieved by slightly raising the heating chamber housing 25 off the bottom of the percolator pot. The motor parts 38 and 40, and the timing wheel 68 will be the same as before. Secured at the inside of the upper wall of the housing 25 is a tubular sleeve 75 in which is slidable a pin 70. In the outer sleeve 75 is a slot 71 in which rides a trigger 72 carried by the pin. The pin is normally held in raised position by the pivoted arm 73. A relatively strong spring 74 is provided to force pin 70 downwardly when arm 73 moves to release trigger 72. The expansion of spring 74 forces housing 25, the fountain tube 24 and other parts upwardly, thus providing a substantial annular opening around the lower edge of the housing. The heating chamber is thus put in relatively free communication with the liquid storage chamber. Pressure will no longer build up in the heating chamber sufficiently to force liquid up through the fountain tube to infusing chamber, and the infusing operation will stop.

It will be evident to those skilled in the art that the various constructions herein illustrated and described serve the same common purpose of effecting discontinuance of the circulation of liquid to the infusing chamber as soon as fluid motor actuated timing mechanism which forms a part of the invention completes its timing period. It will be seen that the invention is equally applicable to various types of percolators regardless of the character of heating means employed therewith, and that the control mechanism of the invention is no way dependent upon the discontinuance of the heat. It is contemplated that the timing and control mechanism may be manufactured as a separate unit for installation in various types of percolators. The scope of the invention is to be determined according to the appended claims and is not to be taken as limited to the details of construction of the various embodiments herein set forth.

I claim:

1. In a percolator, a liquid heating chamber, an infusing chamber receiving liquid from the heating chamber, control means for controlling the flow of liquid between the chambers, and variable speed fluid motor timing mechanism for actuating the control means and operating in dependency on boiling of the liquid.

2. In a percolator, a liquid heating chamber, an infusing chamber receiving liquid from the heating chamber, control means for stopping the flow of liquid from the heating chamber to the infusing chamber, and variable speed fluid motor timing mechanism for actuating the control means adapted to be impelled by liquid in the percolator, said timing mechanism being set running by boiling of the liquid and operating at a speed dependent on the intensity of boiling.

3. A percolating device for a percolator comprising a base member housing a liquid heating chamber, a fountain tube upstanding from the base member through which liquid is forced upwardly from the heating chamber and discharged at its upper end, valve means operative to stop the flow of liquid to the upper end of the fountain tube, a motor for actuating the valve means, and timing means controlling operation of the motor.

4. A percolating device for a percolator comprising a base member housing a liquid heating chamber, a fountain tube upstanding from the base member through which liquid is forced upwardly from the heating chamber and discharged at its upper end, control means for stopping the flow of liquid to the upper end of the fountain tube, a reciprocable vane in the heating chamber responsive to movement of fluid therein and actuating means for the control means operable by said vane.

5. A percolating device for a percolator comprising a base member housing a liquid heating chamber, a fountain tube upstanding from the base member through which liquid is forced upwardly from the heating chamber and discharged at its upper end, control means for stopping the flow of liquid to the upper end of the fountain tube, a rotatable disc, fluid motor means adapted to be driven by movement of liquid in the percolator for rotating the disc, and means operated by the disc in the course of its rotation to actuate the control means to stop the flow of liquid through the fountain tube.

6. A percolating device for a percolator comprising a base member housing a liquid heating chamber, a fountain tube upstanding from the base member through which liquid is forced upwardly from the heating chamber and discharged at its upper end, control means for stopping the flow of liquid to the upper end of the fountain tube, and a motor for operating the control means comprising a rotatable disc, fluid operated means for rotating the disc adapted to be impelled by movement of liquid in a percolator, and a variable timing element responsive to movement of the disc and operable to actuate the control means after a selected number of revolutions of the disc.

7. A percolating device for a percolator comprising a base member housing a liquid heating chamber, a fountain tube upstanding from the base member through which liquid is forced upwardly from the heating chamber and discharged at its upper end, control means for stopping the flow of liquid to the upper end of the fountain tube, a rotatable disc, fluid responsive motor means for rotating the disc adapted to be impelled by the percolator liquid, and adjustable cam wheel rotatable on the disc and adapted to make a partial revolution upon each full revolution of the disc, and means actuated by said cam wheel upon the cam wheel reaching at a certain position in its revolution to actuate the control means to stop the flow of liquid to the upper end of the fountain tube.

8. A percolating device for a percolator comprising a base member housing a liquid heating chamber, a fountain tube upstanding from the base member through which liquid is forced upwardly from the heating chamber and discharged at its upper end, control means for stopping the flow of liquid to the upper end of the fountain tube, a motor comprising a rotatable disc, a reciprocable vane responsive to agitation in the heating chamber, a pawl actuatable by the vane for rotating the disc, and means carried by the disc for actuating the control means.

9. In a percolator, a storage chamber, a base member comprising a liquid heating chamber communicating with said storage chamber, a fountain tube upstanding from the base member through which liquid is forced upwardly from the heating chamber and discharged from its upper end, a valve operable to reduce fluid pressure in the tube and effect discontinuance in the flow of liquid to the upper end of the tube, and motor means actuated by movement of liquid in the liquid heating chamber and operative independently of the liquid level in the liquid storage chamber after a running period to actuate the pressure reducing valve.

10. In a percolator, a liquid storage chamber, a base member comprising a liquid heating chamber communicating with said storage chamber, a fountain tube upstanding from the base member through which liquid is forced upwardly from the heating chamber and discharged from its upper end, a valve in the heating chamber operable when opened to reduce the pressure in the fountain tube and prevent the discharge of liquid from the upper end of the tube, and motor means operative after a running period to open said valve independently of the liquid level in the liquid storage chamber.

11. In a percolator, a liquid storage chamber, a base member housing a liquid heating chamber communicating with said storage chamber, a fountain tube upstanding from the base member through which liquid is forced upwardly from the heating chamber and discharged from its upper end, control means for opening the heating chamber to direct communication with the liquid storage chamber, thereby to reduce the pressure therein sufficiently to stop the flow of liquid to the upper end of the fountain tube, and motor means operative after a running period to actuate said control means independently of the liquid level in the liquid storage chamber.

12. In a percolator, a liquid storage chamber, a base member housing a liquid heating chamber communicating with said storage chamber, a fountain tube upstanding from the base member through which liquid is forced upwardly from the heating chamber and discharged at its upper end, valve means operative to stop the flow of liquid to the upper end of the fountain tube, and motor means independent of the liquid level in the liquid storage chamber impelled by agitation of the liquid under boiling for actuating said valve means.

13. A percolating device for a coffee percolator comprising a base member comprising a liquid heating chamber, a fountain tube upstanding from the base member through which liquid is forced upwardly from the heating chamber and discharged from its upper end, valve means for regulating the flow of liquid through the fountain tube, fluid operated actuating means impelled by the flow of infusing liquid under boiling, and means operated by said actuating means after a running period for operating said valve means to stop the flow of liquid through the fountain tube.

14. A percolating device for a coffee percolator comprising a base member comprising a liquid heating chamber, a fountain tube upstanding from the base member through which liquid is forced upwardly from the heating chamber and discharged from its upper end, a cut-off valve in the fountain tube, and fluid current operated timing mechanism responsive to agitation of the liquid in the heating chamber under boiling operative independently of flow of liquid through the fountain tube for closing said valve.

15. A percolating device for a beverage infusing apparatus including a fountain tube through which infusion liquid is forced upwardly for discharge through its upper end, valve means for stopping the flow of liquid through the fountain tube, and a reciprocating member adapted to be oscillated by the infusion liquid during the percolation thereof and means operable by the reciprocating member after a running period to actuate the valve means to stop flow of liquid through the fountain tube.

BROOKS B. HARDING.